UNITED STATES PATENT OFFICE 2,467,894

METHOD OF PREPARING MONOALKYL AND DIALKYL CARBAMYL PIPERAZINES

Samuel Kushner, Nanuet, and Louis Brancone, Pearl River, N. Y., assignors to American Cyanamid Company, New York, N. Y., a corporation of Maine No Drawing. Application March 24, 1948, Serial No. 16,878

12 Claims. (Cl. 260—268)

The present invention relates to new organic compounds and their preparation. More particularly, it relates to substituted carbamyl piperazines and to methods of preparing the same.

In our co-pending application, Serial Number 661,884, filed April 12, 1946, we disclosed carbamyl piperazines having the general formula:

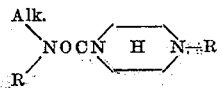

in which R is hydrogen or an alkyl radical and Alk. is an alkyl radical. These compounds are highly effective in the treatment of filariasis and in veterinary practice in the treatment of ascarides in animals such as the dog. They exhibit low toxicity and are very effective in relatively small doses.

We have now found in the present application, that compounds having the general formula:

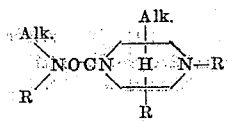

in which R is hydrogen or a lower alkyl radical and Alk. is a lower alkyl radical, are in general highly active as filaricides. As used herein the term "lower alkyl" radical means a radical of one to four carbon atoms. The invention is also concerned with salts of these compounds, both addition salts, such as the hydrochloride, sulfate, citrate and the like, and quaternary salts such as the methochloride, methiodide, ethobromide, benzochloride and the like.

In general, the compounds of the present invention are colorless to pale yellow oils soluble in most organic solvents. In the form of their acid salts they are white, hygroscopic solids soluble in water.

The compounds of the present invention are generally prepared by acylating an alkyl substituted piperazine with a carbamyl halide substituted on the nitrogen by one or two alkyl groups. As a starting material, a C-substituted alkyl piperazine such as 1,2,5-trimethylpiperazine; 2,5-dimethylpiperazine; 1,2,6 - trimethylpiperazine; 2,6 - dimethylpiperazine; 1,3,5 - trimethylpiperazine, etc., may be used, either in anhydrous form or as a hydrate such as 2,5-dimethylpiperazine hexahydrate. In carrying out the present invention it is preferred that non-aqueous solvents including benzene, toluene, chloroform, carbon tetrachloride, dibutyl ether and the like be used. It is preferred that an alkyl piperazine, rather than a hydrate thereof, be used as starting material and that a sufficient excess be used to provide an acceptor for hydrochloric acid formed during reaction.

The reaction is readily carried out in solution. Temperatures of 20° to 100° C. are usually sufficient to accomplish the reaction in a reasonable time. Generally, about 30° to 50° C. will be employed when aqueous alcohol is used as the solvent, while somewhat higher temperatures are desirable for the non-aqueous solvents. At temperatures below this level the reaction may be too slow, and temperatures above this level serve no particular useful purpose.

Substantially any carbamyl halide of the type

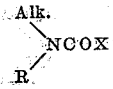

wherein Alk. and R have the values noted above and X is halogen, may be used; such as for example mono-methyl, mono-ethyl, mono-propyl, dimethyl, diethyl, di-isopropyl, di-n-propyl, methyl ethyl carbamyl halides and the like. The reactions using diethylcarbamyl halides, such as the chloride may be taken as illustrative since the reaction is typical. The invention, however, is not so limited. Although any halogen may be used the chloride and bromide are the most practical.

When the reaction is carried out in an aqueous alcohol, such as about 85% ethanol, the unreacted starting alkyl piperazine is caused to precipitate after the reaction by acidification of the medium with an acid such as hydrochloric acid. After this is removed by filtration, essentially only the mono- and di-carbamylalkylpiperazines remain in the aqueous alcoholic filtrate. Concentration of this filtrate by distillation, followed by removal of the last traces of water through azeotropic distillation with benzene, toluene, or the like leaves the mono-carbamylalkylpiperazine in suspension as its insoluble hydrochloride while the di-carbamylalkylpiperazine remains in solution. The former in the form of its salt is then readily obtained in nearly a pure state by filtration. The latter may be recovered from the filtrate on concentration by distillation or evaporation and cooling.

Alkylation of the isolated mono-carbamylalkylpiperazines may be carried out by the usual procedures for alkylating secondary amines. In general, alkyl sulfates, alkyl sulfonates and alkyl halides may all be used as alkylating agents, with the possible exception of alkyl iodides which tend to form quaternary salts. In the specific case of methylation, rather than the use if the above alkylating agents, a preferable method is a reductive methylation using formaldehyde in formic acid or formaldehyde in hydrochloric acid in the presence of zinc dust.

The process of the present invention will be more fully illustrated in conjunction with the folowing examples in which the process is to be taken as illustrative only and not by way of limitation. All parts are by weight unless otherwise noted.

As was pointed out above, it is not necessary to utilize an aqueous solvent. This is illustrated in the following example. In fact, non-aqueous solvents are preferable in acylating C-alkyl substituted piperazines. In using non-aqueous solvents, the piperazine, rather than a hydrate thereof, should be the preferable starting material. A sufficient excess should be used to provide an acceptor for hydrochloric acid formed during reaction.

EXAMPLE 1

*1-diethylcarbamyl-2,5-dimethylpiperazine*

In 400 parts of dry benzene, 114 parts of anhydrous 2,5-dimethylpiperazine is dissolved at 65° C. To this is added dropwise 67.8 parts of diethylcarbamyl chloride with the temperature being kept at 65°–70° C. The reaction mixture is stirred at 70° C. for one-hour and then is heated under reflux for six hours. The reaction mixture is cooled to 15°–20° C., 120 parts of ethanol is added, and it is made acidic by addition of concentrated hydrochloric acid. The unreacted 2,5-dimethylpiperazine precipitates as its dihydrochloride and is removed by filtration. The filtrate is concentrated to a syrupy residue. This residue is cooled, made strongly basic with 50% sodium hydroxide solution, and the oil which separates is dissolved in diethyl ether. After drying the ether solution over solid potassium hydroxide, the solvent is removed by distilaltion; and the residue is distilled under diminished pressure to give 1-diethylcarbamyl-2,5-dimethylpiperazine having a boiling point of 105°–107° C. at 1.5 mm.

EXAMPLE 2

*1-diethylcarbamyl-2,5-dimethylpiperazine hydrochloride*

By following the procedure of Example 1 and acidifying the reaction mixture with hydrochloric acid, crude 1-diethylcarbamyl-2,5-dimethylpiperazine hydrochloride is obtained. Liberation of 1-diethylcarbamyl-2,5-dimethylpiperazine from this crude hydrochloride by treatment with 50% sodium hydroxide, extraction of the oily base with ether, drying the ether and removing the solvent by distillation, and finally distilling under diminished pressure gives pure 1-diethylcarbamyl-2,5-dimethylpiperazine.

EXAMPLE 3

*1-diethylcarbamyl-2,4,3-trimethylpiperazine*

91 parts of 1-diethylcarbamyl-2,5-dimethylpiperazine is dissolved in 65 parts of 90% formic acid. Then 53 parts of 36% aqueous formaldehyde is added dropwise at 75° C. over a period of fifteen minutes. The mixture is refluxed at 105°–110° C. for two hours. The excess formic acid is removed by distillation until the temperature of the residue rises to about 150° C. After the distillation of the formic acid, the residue is cooled to 25° C. It is made strongly basic to phenolphthalein with 50% caustic solution. The oil which separates is isolated and dried over potassium hydroxide pellets. After drying, the oil is submitted to distillation under diminished pressure and yields pure 1-diethylcarbamyl-2,4,5-trimethylpiperazine, boiling point 86°–89° C. at 1.0 mm.

In some of the examples shown above the hydrochloride salts of the piperazine derivatives are obtained. If the compound itself is desired, the salt is dissolved in water and the solution saturated with a mild alkali such as potassium carbonate. The product is then extracted with chloroform, dried, and after removal of the chloroform, distilled.

We claim:

1. Compounds having the general formula:

in which R is a member of the group consisting of hydrogen and lower alkyl radicals and Alk. is a lower alkyl radical, and salts thereof.

2. Compounds having the general formula:

in which Alk. is a lower alkyl radical, and salts thereof.

3. Compounds having the general formula:

in which Alk. is a lower alkyl radical.

4. 1-diethylcarbamyl-2,5-dimethylpiperazine.

5. 1-diethylcarbamyl - 2,4,5 - trimethylpiperazine.

6. 1-dimethylcarbamyl - 2,4,5 - trimethylpiperazine.

7. A method of preparing compounds having the formula:

in which R is a member of the group consisting of hydrogen and lower alkyl radicals and Alk. is a lower alkyl radical which comprises mixing together and allowing to react a compound having the formula:

in which R and Alk. are as defined above and a member of the group consisting of monoalkylcarbamyl halides and dialkylcarbamyl halides in a solvent.

8. A method of preparing compounds having the formula:

in which Alk. is a lower alkyl radical which comprises mixing together and allowing to react a compound having the formula:

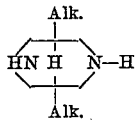

in which Alk. is as defined above and a dialkyl carbamyl halide in a solvent.

9. A method of preparing compounds having the formula:

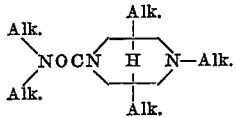

in which Alk. is lower alkyl which comprises mixing together and allowing to react a compound having the formula:

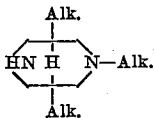

in which Alk. is as defined above and a dialykl carbamyl halide in a solvent.

10. A method of preparing 1-diethylcarbamyl-2,5-dimethylpiperazine which comprises mixing together 2,5-dimethylpiperazine and diethylcarbamyl chloride in a solvent.

11. A method of preparing 1-diethylcarbamyl-2,4,5-trimethylpiperazine which comprises mixing together 2,4,5-trimethylpiperazine and diethylcarbamyl chloride in a solvent.

12. A method of preparing 1-dimethylcarbamyl - 2,4,5 - trimethylpiperazine which, comprises mixing together 2,4,5-trimethylpiperazine and dimethylcarbamyl chloride in a solvent.

SAMUEL KUSHNER.
LOUIS BRANCONE.

No references cited.